United States Patent [19]

Findakly

[11] Patent Number: 4,515,428
[45] Date of Patent: May 7, 1985

[54] INTEGRATED OPTICAL STAR COUPLER

[75] Inventor: Talal K. Findakly, Los Angeles, Calif.

[73] Assignee: TRW Inc., Redondo Beach, Calif.

[21] Appl. No.: 417,734

[22] Filed: Sep. 13, 1982

[51] Int. Cl.³ .............................................. G02B 5/174
[52] U.S. Cl. ............... 350/96.12; 350/96.15; 350/96.16
[58] Field of Search ............... 350/96.11, 96.12, 96.15, 350/96.16

[56] References Cited

U.S. PATENT DOCUMENTS

| 3,977,762 | 8/1976 | Sandbank | 350/96.15 |
| 4,116,530 | 9/1978 | Bellavance et al. | 350/96.12 |
| 4,165,225 | 8/1979 | Auracher et al. | 350/96.28 X |
| 4,262,995 | 4/1981 | Tangonan | 350/96.16 |
| 4,278,321 | 7/1981 | Mack et al. | 350/96.12 |

FOREIGN PATENT DOCUMENTS 2340020 2/1975 Fed. Rep. of Germany ... 350/96.15

OTHER PUBLICATIONS

Findakly et al., *Appl. Phys. Lett.*, vol. 40, No. 7, 1 Apr. 1982, "Single-Mode Integrated Optical 1xN Star Coupler", pp. 549-550.
Somekh et al., Appl. Phys. Lett. vol. 22, No. 2, 15 Jan. 1973, "Channel Optical Warguide Directional Couplers", pp. 46-47.

*Primary Examiner*—William L. Sikes
*Assistant Examiner*—Frank González
*Attorney, Agent, or Firm*—Noel F. Heal; Robert M. Wallace

[57] ABSTRACT

A single-mode integrated optical star coupler employing weighted directional coupling between pairs of non-parallel waveguides formed on a substrate. Light launched into an input waveguide is split into desired, and usually equal-power proportions among a plurality of output waveguides, without the use of conventional Y-section branches and with a minimum of waveguide bends. At each non-parallel coupling point, light in a first waveguide is coupled, to a predetermined degree, into a second waveguide with one end in a close, non-parallel relationship with the first waveguide. In one embodiment, the output waveguides are all coupled to the input waveguide in this manner. In other embodiments, the input waveguide power is first split between two principal output waveguides, and other output waveguides are coupled to the principal output waveguides.

8 Claims, 5 Drawing Figures

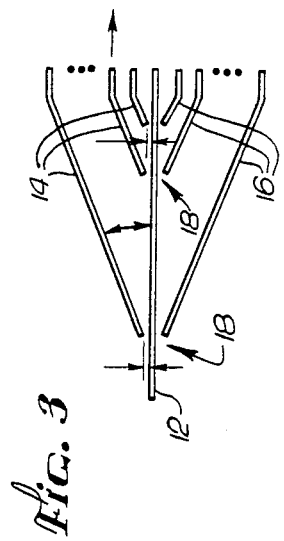
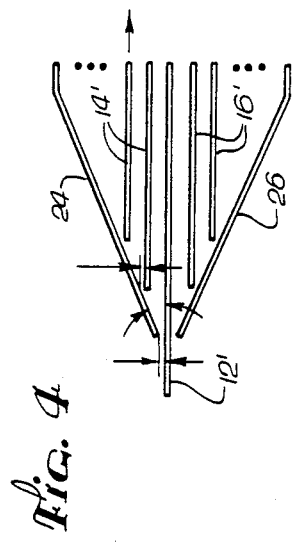
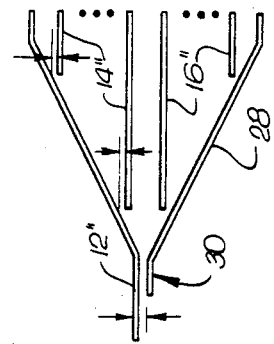
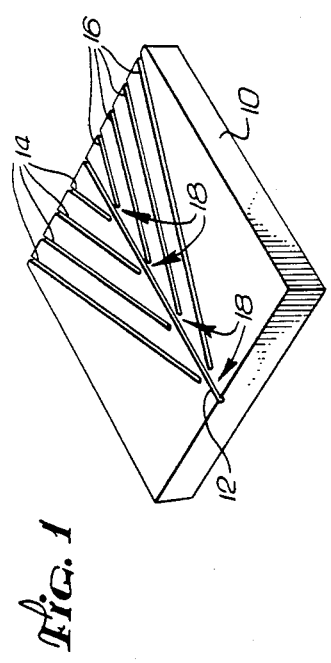
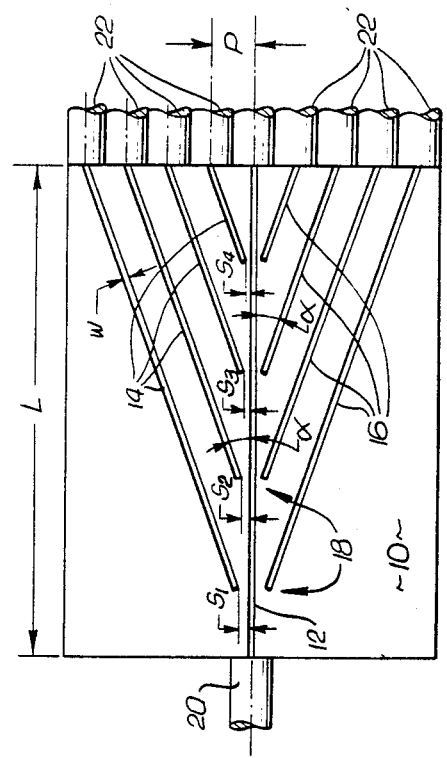

INTEGRATED OPTICAL STAR COUPLER

BACKGROUND OF THE INVENTION

This invention relates generally to integrated optics, and, more particularly, to optical devices for coupling a single input waveguide to a number of output waveguides with a desired apportionment of total power. Coupling devices performing this function are usually referred to as star couplers or 1×N star couplers, to signify that one input channel is coupled to N output channels, in predetermined, most commonly equal, power apportionment. This type of coupling device is often needed in certain types of optical communications networks.

In the past, star couplers of the single-mode type have been fabricated in non-integrated form by encapsulated etching of a bundle of a single-mode fibers. However, couplers cannot be reliably made by this technique in a reproducible fashion. Also, such couplers do not reliably preserve the polarization properties of light transmitted through them. Some star couplers have been fabricated using techniques of "integrated optics." This term encompasses the integration of optical devices on small substrates, using such methods as photolithography, in much the same manner that they are employed in the fabrication of integrated circuitry.

Limited forms of star couplers have been made using parallel couplers, in which light from a first waveguide is coupled to a second waveguide through closely spaced parallel portions of the two waveguides, or using Y-junction branching circuits to bifurcate the transmitted light into two approximately equal portions. U.S. Pat. No. 4,165,225 to Auracher et al. discloses a coupler formed from a number of Y junctions connected in a tree-like structure to divide one input signal into a plurality of output signals of approximately equal power. Unfortunately, there is an inherent difficulty in making consistently equal power splits with Y junctions. Also, arrangements like the Auracher one necessitate 2N-2 bends in a 1×N coupler, and are therefore subject to considerable losses.

Another coupler of the prior art, as taught by U.S. Pat. No. 4,262,995 to Tangonan, has a plurality of waveguides that open into a single mirrored "mixing chamber." Light emerging into the chamber from one of the waveguides is mixed by repeated reflections and launched into the other waveguides in practically equal portions. However, the device is unsuitable for single-mode operation, and is subject to relatively high losses.

Others in the field have proposed using arcuate waveguides, in integrated optics form, as coupling devices. U.S. Pat. No. 4,116,530 to Bellavance et al. teaches a technique for fabricating such arcuate waveguides. U.S. Pat. No. 3,977,762 to Sandbank also discloses a device using arcuate waveguides, but not in the context of star couplers.

It will be appreciated from the foregoing that there is still a significant need in the field of integrated optics for a star coupler compatible with single-mode fibers and with minimal insertion losses. Ideally, the star coupler should be easily and repeatedly fabricated to produce a desired division or equality of power outputs, and should have strong polarization preservation properties. The present invention is directed to these ends.

SUMMARY OF THE INVENTION

The present invention resides in a single-mode integrated optical star coupler employing weighted directional coupling between pairs or sets of non-parallel waveguides. Briefly, and in general terms, the star coupler of the invention comprises a substrate, an input waveguide formed in the substrate and having an end portion into which input light is launched, and a plurality of output waveguides also formed in the substrate, each output waveguide has an input end adjacent the input waveguide and an opposite output end forming an output port, the output waveguides are arranged in a linear array at at least one side, and most commonly in a linear array at each side, of the input waveguide. The output ends of the output waveguides in each array and preferably all the waveguide output ends are substantially parallel and uniformly spaced. Significantly, the input and output waveguides are coupled together at a plurality of interaction regions at which at least one of the output waveguides is disposed with its input end at a preselected spacing from another of the waveguides and at a preselected tilt angle with respect to the other of the waveguides, the spacings and tilt angles being chosen to effect a predetermined and commonly equal division of power among the output ports.

In one preferred embodiment of the invention, each of the output waveguides forms an interaction region with the input waveguide and has its input end portion tilted with respect to the input waveguide and a bend connecting this end portion with the output end of the respective waveguide. The output waveguides are arranged in symmetrical pairs, with the waveguides of each pair located at opposite sides of and forming an interaction region with the input waveguide. In the preferred form of this embodiment, the input waveguide extends beyond all of the interaction regions and forms an additional coupler output port.

In a second embodiment of the invention, the output waveguides include first and second waveguides symmetrically disposed at opposite sides of and coupled to the input waveguide at a single interaction region, and form the outermost output waveguides of the coupler. Half of the remaining output waveguides are coupled to the first outer waveguide and the other half of the remaining output waveguides are coupled to the second outer waveguide in a symmetrical manner. Preferably, the input waveguide extends beyond the interaction region coupling to the first and second waveguides, and forms an additional coupler output port.

In a third embodiment of the invention, the coupler further includes a first outer output waveguide having its input end parallel-coupled with the input waveguide. The input waveguide extends symmetrically with the first outer waveguide and functions as a second outer waveguide, forming an output port of the coupler. The remaining output waveguides are disposed in parallel relation between the outer waveguides, half of them being coupled to the first outer waveguide and half coupled to the second outer waveguide.

The star coupler of the invention includes only a minimal number of bends as contrasted with, for example, a coupler employing Y branches. Consequently, its insertion loss is relatively low. Moreover, the coupler of the invention is compatible with single-mode fibers and preserves the polarization properties of light passed through it. Also important from a manufacturing standpoint is the ease with which the coupler may be fabricated to provide in a repeatable manner a predetermined, and most commonly equal, power distribution from the input waveguide to the output ports. It will therefore be appreciated that the present invention represents a significant advance in the field of integrated optics. Other aspects and advantages of the invention will become apparent from the following more detailed description, taken in conjunction with the accompanying drawings.

BRIEF DESCRIPTION OF THE DRAWINGS

FIG. 1 is a simplified perspective view of a first embodiment of the novel star coupler of the invention, having nine output ports, and showing the tilt angles of the waveguides exaggerated for purposes of illustration;

FIG. 2 is an enlarged plan view of the star coupler of FIG. 1; and

FIGS. 3–5 are generalized plan views of first, second and third embodiments of the invention, respectively, again showing the tilt angles of the waveguides exaggerated for purposes of illustration.

DESCRIPTION OF THE PREFERRED EMBODIMENTS

As shown in the drawings for purposes of illustration, the present invention is concerned with the coupling of light from an input fiber to a plurality of output fibers, with a predetermined, and most commonly equal division of power and with minimal insertion losses. Prior to this invention, optical star couplers for this purpose suffered from various drawbacks, including difficulty of manufacture in a repeatable manner, high losses, and inability to preserve polarization characteristics of the transmitted light.

In accordance with the invention, waveguide bends and their resultant losses are minimized, and light is coupled from input to output ports by means of weighted directional coupling between sets of nonparallel waveguides. Non-parallel coupling avoids unnecessary bends, and still allows for control of coupling coefficients by preselection of waveguide spacings.

A first embodiment of the invention is shown in FIGS. 1–3. Basically, this embodiment of the star coupler includes a substrate, indicated by reference numeral 10, with waveguides formed on one of its surfaces. An input waveguide 12 extends from a first edge 10a of the substrate 10 to a second, parallel edge 10b, where it provides an output port, and is oriented perpendicular to the first and second edges. A number of output waveguides, half of which are indicated by reference numeral 14 and the other half by reference numeral 16, extend to the second edge 10b of the substrate 10 from interaction regions 18 spaced along the input waveguide 12. The output waveguides indicated at 14 are arranged on one side of the input waveguide 12, and those indicated at 16 are arranged in a symmetrical fashion on the other side of the input waveguide. Each output waveguide 14 and 16 has an input end adjacent and forming an interaction region 18 with the input waveguide 12 and an opposite output end forming an output port at the substrate edge 10b.

Each interaction region 18 provides for coupling of light from the input waveguide 12 to one of the output waveguides 14 and one of the output waveguides 16. The closest distance (S1, S2, S3, S4) between the input waveguide 12 and the input ends of the waveguides 14 and 16 is selected to effect a desired degree of coupling. Each interaction region 18 extends for a short distance beyond the point of closest proximity of the coupled waveguides. Since the spacing distance increases linearly, as measured along the input waveguide, the coupling between the waveguides quickly falls off to practically zero.

As shown by way of example in FIG. 2, an input fiber 20 is coupled to the input waveguide 12 at the first edge 10a of the substrate 10, and nine output fibers 22 are coupled to the output ports of the output waveguides 14 and 16 at the second edge 10b of the substrate. Since the output waveguides 14 and 16 are shown in FIGS. 1 and 2 as being straight, their output ends are oblique to the substrate edge 10b and there is an inherent bend in the output light paths, at the transitions between the waveguides 14 and 16 and the output fibers 22. Alternatively, as shown in FIG. 3, all of the output waveguides 14 and 16 could be provided with a bend near the second edge 10b of the substrate 10, to align the output ends of the output waveguides perpendicular to the substrate edge 10b and parallel to the output fibers 22.

A second embodiment, shown in FIG. 4, eliminates all but two of these bends. As in the first embodiment, an input waveguide 12' extends across the substrate and forms one of the output ports of the device. Two outermost output waveguides 24 and 26 are coupled to the input waveguide 12' in the same manner as the outermost output waveguides of the first-described embodiment. However, the waveguides 24 and 26 are much more closely coupled to the input waveguide 12' and receive all except one Nth of the total power, where N is the number of output ports. Half of the remaining output waveguides 14' are parallel with the input waveguide 12' and are coupled to the first outer waveguide 24, while the other half of the remaining output waveguides 16' are also parallel to the input waveguide and are coupled to the outer waveguide 26.

This arrangement of the second embodiment eliminates bends in all except those in the outer waveguides 24 and 26. However, the arrangement also necessitates close control over the spacing between these outer waveguides 24 and 26 and the input waveguide 12'. This possible disadvantage is eliminated in a third embodiment, shown in FIG. 5.

In the FIG. 5 embodiment, the input waveguide 12" is coupled to an output waveguide 28 by means of a parallel directional coupling 30, which splits the power into two equal portions. The input waveguide 12" and the waveguide 28 then diverge and form the outermost output waveguides, each having a single bend to render them parallel before reaching the opposite edge of the substrate 10". Half of the remaining output waveguides 14" are coupled to the input waveguide 12" and the other half of the output waveguides 16" are coupled to the other outer waveguide 28, in much the same manner as in the second embodiment (FIG. 4). Since the degree of interaction provided by the parallel coupling 30 can be easily controlled during fabrication, the desired power division is more easily obtained than in the second embodiment (FIG. 4). The price of this added convenience is the addition of an extra bend in each of the outer waveguides 28 and 12".

Analysis of waveguide interaction between non-parallel waveguides follows from coupled mode theory and is similar to the corresponding theory for parallel waveguides, with the exception that the coupling factor is a varying function of distance. In the case of two waveguides, a and b, where input power is initially fed into waveguide a and is partially coupled to waveguide b, one end of which is in a non-parallel relationship with waveguide a, as in FIGS. 4 and 5, the apportionment of power is as follows:

$$P_a(z) = \cos^2(\theta(z)), \quad (1)$$

$$P_b(z) = \sin^2(\theta(z)), \quad (2)$$

where $$\theta(z) = \int_0^z K(z)dz. \quad (3)$$

and $K(z)$ = the coupling coefficient at a distance z from the point of closest spacing of the two waveguides.

The degree of coupling decreases as the spacing and z increase, until there is no coupling as $z \to 2\delta$. The net power transfer therefore corresponds to a finite value of $\theta(\infty)$. For a linear increase in the spacing, as in the present case of straight waveguides in the interaction regions, the value of $\theta(\infty)$ has the value:

$$\theta(\infty) = K(z=0)/\gamma \tan \alpha, \quad (4)$$

where $\gamma$ is the transverse decay constant and $\alpha$ is the angle between the waveguides.

For the case of three coupled waveguides, a, b and c, where the input power is initially fed into the central waveguide b, the division of power is given by:

$$P_b = \cos 2(\sqrt{2})\theta(\infty)). \quad (5)$$

$$P_a = P_c = \tfrac{1}{2} \sin^2(\sqrt{2})\theta(\infty)), \quad (6,7)$$

where $\theta(\infty)$ is as given in equation (4).

In designing a specific coupler, the value of $\theta(\infty)$ is selected to provide the desired power division at each interaction region. Then the tilt angle and the minimum spacing are selected to satisfy equation (4).

EXAMPLE

Using the techniques of the invention, a 1×3 star coupler was fabricated on a commercial glass slide as a substrate, using the Na+→K+ ion exchange method. The waveguides were 5 μm wide with an initial spacing of 2.0 μm, and the tilt angle was 0.2°. First the waveguide pattern was etched through a deposited aluminum film on the glass substrate. The ion exchange was done at 360° C. by immersing the substrate in molten KNO3 for one hour. The waveguides thus formed were single mode for both TE and TM polarizations at 0.633 μm with a graded index profile. The index increase at the surface was 0.006 and the waveguide thickness was about 2.5 μm. The end faces of the guides were polished to facilitate measurements by end firing. A He-Ne laser beam was focused on the input waveguide in the TE polarization. The output power was measured at relatively equal proportions of 34.4, 32.4 and 33.1%, respectively. Similar results were obtained for the TM polarization. The waveguide losses were estimated at 0.5 dB/cm at 0.633 μm. Several devices were fabricated using the same procedure, and the results were reproducible.

Polarization mode was found to be preserved almost completely between input and output ports. The intermodal coupling was as high as 25 dB.

By way of further example, the following are dimensions for the embodiment shown in FIG. 2:
- substrate length = 20 mm,
- substrate width = 900 μm (0.9 mm),
- output port spacing = 100 μm,
- waveguide width = 2.0 μm,
- tilt angle = 1.85°
- initial waveguide spacings—
  - S1 = 2.7 μm,
  - S2 = 2.35 μm,
  - S3 = 1.85 μm,
  - S4 = 1.0 μm.

It will be appreciated from the foregoing that the present invention represents a significant advance in the field of integrated optical star couplers. In particular, the invention provides a star coupler suitable for coupling single-mode fibers, from a single input port to a plurality of output ports, with a minimum of waveguide bends, and therefore a minimum insertion loss. The coupler also preserves the polarization properties of the input light, and is simple to fabricate in a repeatable manner. Another advantage of the star coupler resides in the fact that it may be arranged to couple the input waveguide to the output waveguide in any predetermined equal or unequal division of optical power among the coupler output ports by proper selection of the spacings and/or the tilt angles between the input waveguide and the input ends of the output waveguides at the interaction regions 18. In most applications, the star coupler will be arranged to couple the input waveguide to the output waveguides in equal or substantially equal power apportionments, as in the illustrated embodiments.

It will be appreciated that, although specific embodiments of the invention have been described in detail for purposes of illustration, various modifications may be made without departing from the spirit and scope of the invention. Accordingly, the invention is not to be limited except as by the appended claims.

We claim:

1. A single-mode integrated optical star coupler comprising:
   a substrate;
   an input single-mode waveguide on said substrate and having an end portion into which input light is launched;
   a plurality of output single-mode waveguides on said substrate, each having an output end portion forming an output port, said output end portions being substantially parallel and uniformly spaced in a linear array; and wherein said input and output single-mode waveguides are coupled together at a plurality of interaction regions at which at least one of said waveguides is located with an end thereof at a preselected spacing from and tilt angle relative to another of said waveguides, the spacing and tilt angles being chosen to effect a predetermined division of power among the output ports.

2. A single-mode integrated optical star coupler as set forth in claim 1, wherein:
   each of said output waveguides forms an interaction region with said input waveguide, and includes a portion tilted with respect to said input waveguide and a bend connecting this portion with said output end portion of the respective waveguide.

3. A single-mode integrated optical star coupler as set forth in claim 1, wherein:

said output waveguides are arranged in symmetrical pairs, each pair forming an interaction region with said input waveguide.

4. A single-mode integrated optical star coupler, comprising:

a substrate;

an input single-mode waveguide on said substrate and having a first end portion into which input power is launched;

a plurality of output single-mode waveguides on said substrate, each having an input end oriented in a predetermined, non-parallel, closely spaced relationship with said input single-mode waveguide, to effect transfer of the input power from said input single-mode waveguide to said output single-mode waveguides, and an output end portion forming an outer port, said output end portions being substantially parallel and uniformly spaced in a linear array; and wherein the spacings and angular orientations of said output single-mode waveguides with respect to said input single-mode waveguide are selected to effect a predetermined division of the input power among the output ports.

5. A single-mode integrated optical star coupler as set forth in claim 4 wherein:

said output waveguides are arranged in symmetrical pairs, the waveguides in each pair being disposed on opposite sides of said input waveguide and being coupled to said input waveguide at a common interaction region.

6. A single-mode integrated optical star coupler as set forth in claim 1, 2, 3, 4 or 5 wherein:

said input waveguide has an output end forming an additional output port.

7. A single-mode integrated optical star coupler as set forth in claim 1, 2, 3, 4 or 5 wherein:

said waveguides are spaced and oriented to provide a substantially equal division of the input power among the output ports.

8. A single-mode integrated optical star coupler as set forth in claim 1 or 4, wherein:

said waveguides are spaced and oriented to provide a predetermined unequal division of the input power among the output ports.

* * * * *